United States Patent [19]

Tiskus

[11] 4,320,656
[45] Mar. 23, 1982

[54] THERMOCOUPLE APPARATUS FOR INDICATING LIQUID LEVEL IN A CONTAINER

[75] Inventor: John R. Tiskus, Monroeville, Pa.

[73] Assignee: United States Steel Corporation, Pittsburgh, Pa.

[21] Appl. No.: 173,220

[22] Filed: Jul. 28, 1980

[51] Int. Cl.³ ............................................. G01F 23/72
[52] U.S. Cl. .................................................... 73/295
[58] Field of Search ................... 73/295, 343 B, 359 R

[56] References Cited

U.S. PATENT DOCUMENTS

| | | | |
|---|---|---|---|
| 3,204,460 | 9/1965 | Milnes | 73/295 |
| 3,399,568 | 9/1968 | Wilson | 73/295 |
| 3,745,828 | 7/1973 | Howell | 73/295 |
| 3,797,310 | 3/1974 | Babcock et al. | 73/295 |

Primary Examiner—Donald O. Woodiel
Attorney, Agent, or Firm—William F. Riesmeyer, III

[57] ABSTRACT

An improvement is provided in thermocouple apparatus for indicating liquid level in a container, particularly a continuous casting mold. The conventional apparatus includes a plurality of thermocouple elements of first polarity connected to the container at spaced levels above and below the liquid and to corresponding spaced points on a slide wire resistor. The container wall acts as the thermocouple element of opposite polarity. A conductor probe is connected to the wall and to a point on the resistor above the uppermost thermocouple element to provide a reference voltage at that point. The probe and thermocouple elements extend to locations adjacent the exterior face of the container which may be subject to substantially variable ambient temperature. The improvement of this invention involves substitution of a portion of the length of either the probe or the thermocouple elements with, a material substantially equivalent to the thermocouple element of first polarity in the case of the probe, or a conductor material equivalent to that of the probe in the case of the thermocouple elements. The substituted portions extend from an internally cooled region of the wall of the container to a location adjacent the exterior of the wall.

1 Claim, 3 Drawing Figures

THERMOCOUPLE APPARATUS FOR INDICATING LIQUID LEVEL IN A CONTAINER

BACKGROUND OF THE INVENTION

This invention relates to apparatus for indicating the level of liquid in a container particularly the level of molten metal in a continuous casting mold.

This invention is an improvement over that of U.S. Pat. No. 3,399,568 Wilson which in turn was an improvement in one embodiment of the invention of U.S. Pat. No. 3,204,460 Milnes, both of common ownership with this application. Wilson is directed to malfunction of the indicator when the metal level in the mold reaches the vicinity of the uppermost thermocouple. When this occurs the emf at the top thermocouple exceeded that of the bottom couple. This produced a zero balance point which caused the pen to be driven to a point falsely indicating the metal level was at the bottom of the measurement range instead of the top. A solution to this problem was provided by a reference probe connected to the mold wall at one end and the top point on the slide wire resistor so as to always provide a reference voltage at that point lower than the top thermocouple. However, there still have been occasions when the indicator malfunctions.

Investigation of this problem indicated that these situations occur when the emf profile is displaced from its normal values. As indicated in FIG. 1 when the profile is substantially displaced the difference between the maximum emfs in the region where the metal level actually is located and the balance point may be small. In this situation the normal 'bias' built into the circuit (to force the pen to the low end of the scale when no signals are present) is larger than the difference between the maximum emf and balance point, thus causing the pen to travel full scale indicating a molten metal level at the bottom of the measuring range instead of the actual metal level.

I have found that the displacement of the emf profile is due to substantial temperature variations at the cold junctions of the thermocouples behind the casting mold. The temperatures at this location can be so high as to sometimes approach the temperature in the interior of the mold.

Several methods of correcting for cold junction temperature variation have been used in the past and are described in Metals Handbook 1948 edition pages 175 and 176. For example, one method is use of longer thermocouple or extension wires having equivalent thermoelectric characteristics instead of normal conductor lead wires. This removes the cold junctions to a more uniform temperature environment but is not always practical. Thermocouple wire is expensive and very long lengths may be required. Another method is to measure the temperature at the cold junctions and enter a calibration factor to an automatic compensator. This, however, is not practical in the present case, since it would overly complicate the level measurement circuitry. I have found a simple modification which overcomes the above disadvantages.

It is then a primary object of this invention to provide an improved liquid level indicating apparatus which will either eliminate or cancel the effect of substantial variation in temperature at thermocouple junctions adjacent an exterior face of the container.

SUMMARY OF THE INVENTION

An improvement is provided in apparatus for indicating the level of a heated liquid in a container having internally cooled walls. The conventional apparatus includes a group of thermocouple elements of first polarity connected to a wall of the container at spaced vertical locations generally above and below the liquid. These elements are connected at one end to points proximate a face of the container wall heated by the liquid. The other end of the elements extend to locations adjacent an exterior face of the container. This face may be subject to substantial variation in temperature from the surrounding ambient environment. The container wall itself, at least the portion of it to which the thermocouple elements are connected, acts itself as the thermocouple element of opposite polarity. A reference conductor probe is electrically connected to the wall proximate the face heated by the liquid. A slidewire resistor is provided. The thermocouple elements of first polarity are connected to the resistor respectively at points corresponding to the spaced vertical locations in the container wall. The conductor probe is connected to the resistor at a point corresponding to a location above the uppermost thermocouple so as to provide a reference voltage to said point. Means is also provided for indicating the position on the resistor corresponding to the level of liquid in the container.

In the improvement of this invention either the probe, or group of thermocouple elements of first polarity, or both, pass through the internally cooled region of the container. In one of them, i.e. the probe or the group, a material is substituted for the portion of their length extending from the internally cooled region of the container wall to a location adjacent the exterior of the wall. In the case of the probe, the substituted portion is a material having substantially the same thermoelectric characteristics as the thermocouple elements of first polarity. In the case of the thermocouple elements themselves, the substituted portion is a conductor equivalent to the material of the reference conductor probe.

DESCRIPTION OF THE PREFERRED EMBODIMENT

Although not limited thereto the invention will be described in an application for determining the level of molten metal in continuous casting by virtue of the temperature profile along the length of an internal wall of the mold. Apparatus for such application is disclosed in U.S. Pat. No. 3,204,460 Milnes, and an improvement thereof in U.S. Pat. No. 3,399,568 Wilson, the specifications of both said patents being incorporated herein by reference.

Figure 1:
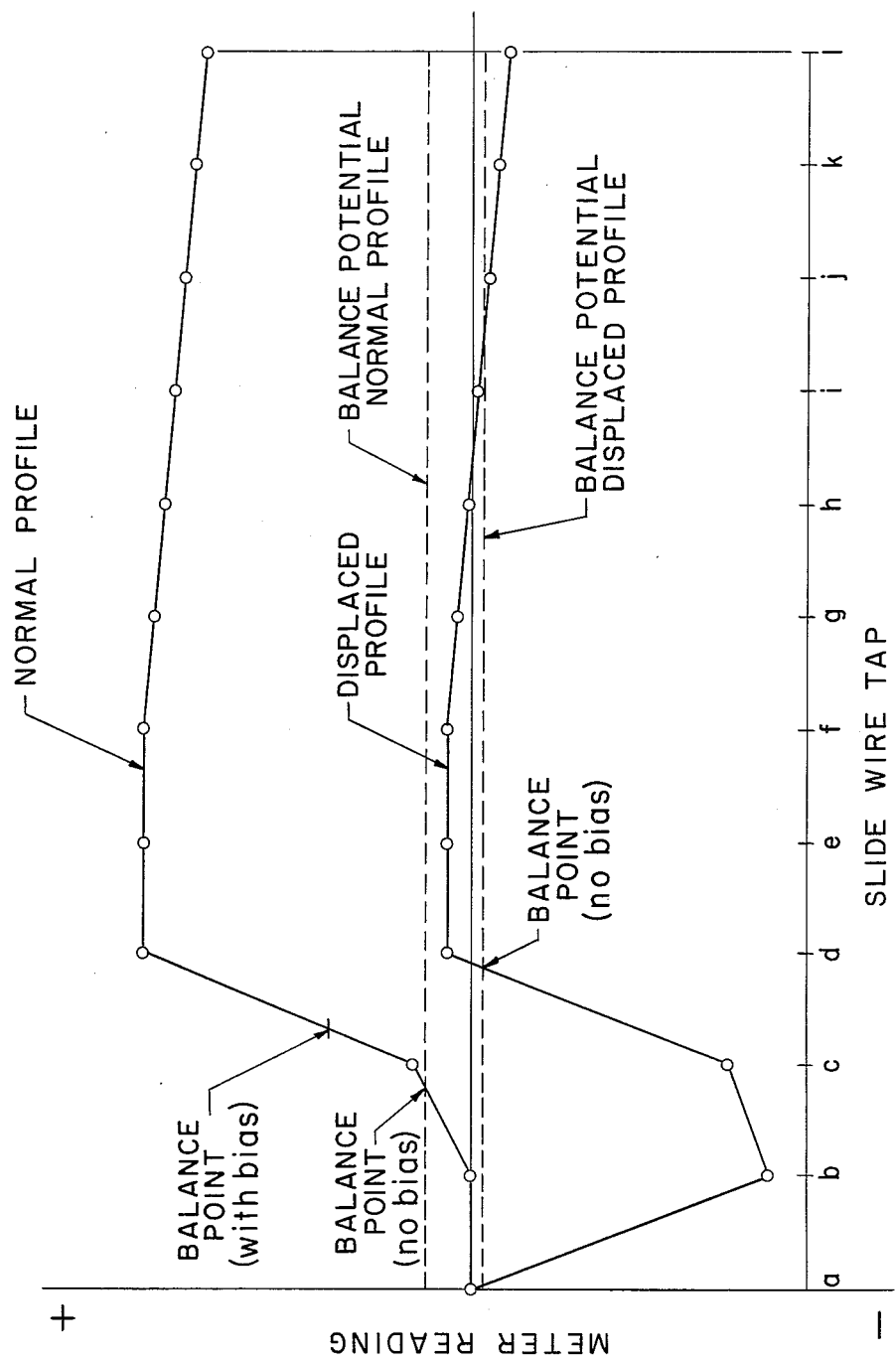
FIG. 1 is a graph showing a normal profile and a displaced profile of the millivolt readings of thermocouples spaced from top to bottom of a continuous casting mold.
Figure 2:
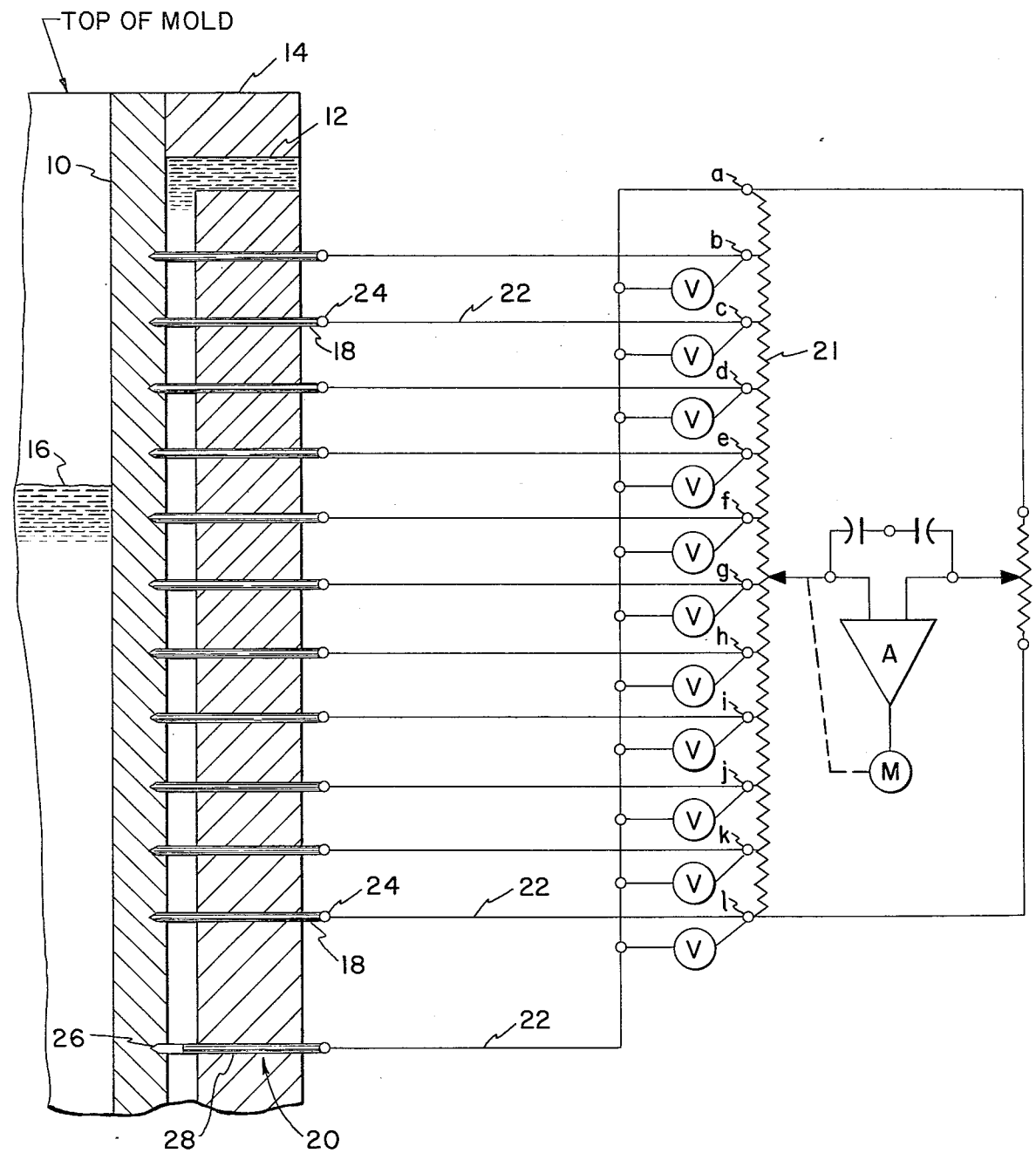
FIG. 2 is a schematic diagram showing a side elevation view of the thermocouple apparatus of this invention inserted in the cross section of a continuous casting mold and electrical circuitry for determining the level of molten metal in the mold.

Referring to FIG. 2 the apparatus of this invention is shown in a drawing similar to that of FIG. 1 of U.S. Pat. No. 3,399,568. A vertical wall of the continuous casting mold is shown in a cross sectional side elevation view and includes copper liner 10, cooling water passage 12 and steel support and backup structure 14. The level of molten metal in the mold is indicated at 16. A plurality of conventional negative thermocouple elements 18 are inserted at spaced levels along the mold length so as to indicate the temperature profile adjacent the hot face. I use Constantan rods extending lengthwise through a metal protection tube with an electrically insulative liner surrounding the rod in the tube. The rods have a bare conically tapered end spring pressed so as to abut the copper liner and make an electrical junction therewith.

A reference probe is generally indicated by arrow 20. Leads 22 connect thermocouple elements 18 and probe 20 to various points on slide wire resistor 21. Points b through l correspond to spaced vertical locations in the mold wall. Point a is a reference value for the balance point as described in U.S. Pat. No. 3,399,568, Wilson.

Figure 3:
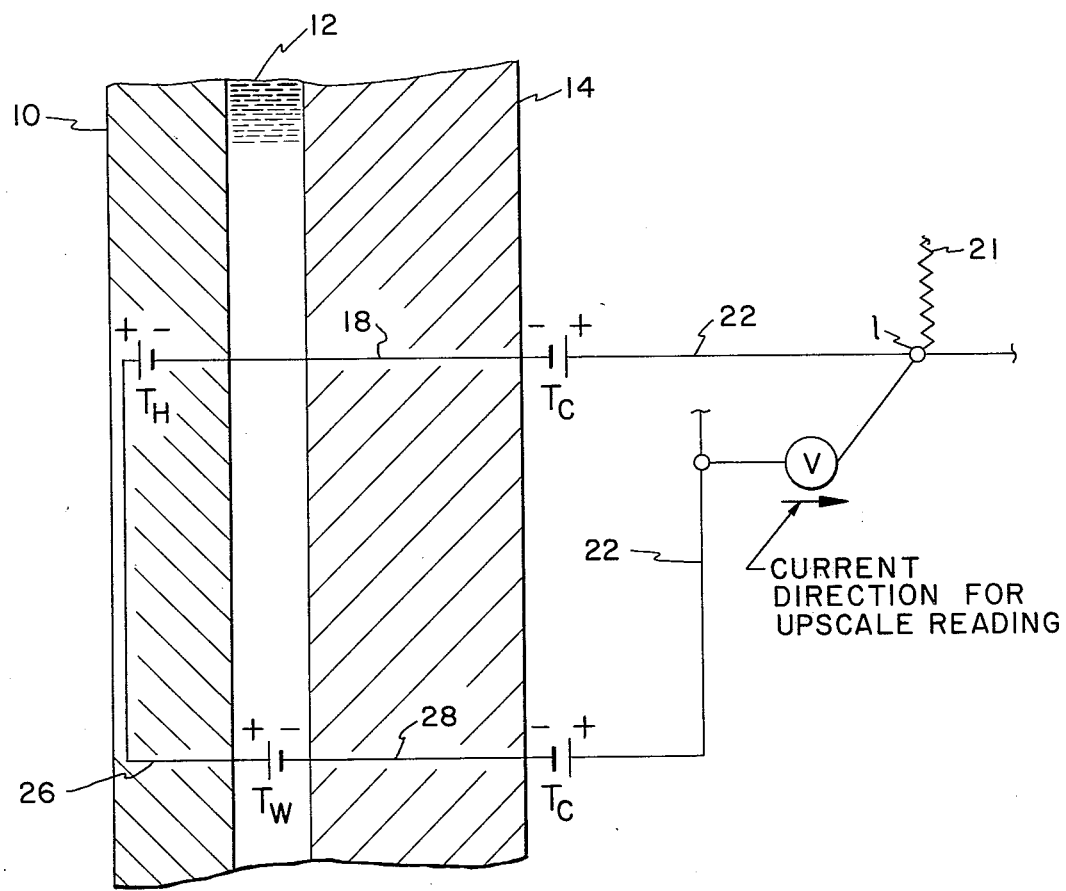
FIG. 3 is an electrical schematic representing the improved thermocouple circuit of this invention which cancels the effect of cold junction temperature variation on the readings.

In the most preferred embodiment of the present invention probe 20 is provided with a copper tip 26 and a Constantan body 28. These portions are preferably joined by brazing their adjacent ends together. FIG. 3 illustrates the effect of the new probe on the circuit. The Tc 'cold' junctions have equal emf's of opposite sign and thus cancel each other. The resultant voltage of each thermocouple element is then referenced against the emf of the junction Tw in the water cooled region of the mold. The emf at Tw has been found to be the same as the emf of the thermocouple elements located above the liquid level. Thus, a voltage profile is provided which is referenced at all points against a uniform standard from which the balance point is calculated.

Although less preferred, the objects of the invention may also be accomplished by using a probe 20 the full length of which is a conductor such as copper. In this case a portion of the length of each thermocouple element extending from the water cooled region of the mold to the exterior face is comprised of a conductor substantially the same as the probe. Of course in some mold designs the thermocouples do not pass through the water cooled region and this latter embodiment is not feasible. In any event, the most preferred embodiment described above requires only one compound probe instead of several.

I claim:

1. In apparatus for indicating the level of a heated liquid in a container having an internally cooled wall, said wall having an interior face heated by the liquid and an exterior face subject to a substantially variable temperature environment, said apparatus including a group of thermocouple elements of first polarity connected to said wall at spaced vertical locations above and below said liquid, said elements being connected proximate the face of said wall heated by the liquid and extending to a location adjacent the exterior face of said wall, a thermocouple element of opposite polarity comprising the portion of said container wall to which said elements of first polarity are connected, a conductor probe of material equivalent in thermoelectric characteristics to said wall connected thereto proximate the face thereof heated by said liquid and extending to a location adjacent the exterior face of said wall, a slide-wire resistor, said elements of first polarity being connected respectively to points spaced on said resistor corresponding to said spaced locations in the container wall, said probe being connected to a point on said resistor corresponding to a location above the uppermost thermocouple element so as to apply a reference voltage at said point, and means for locating a position on said resistor corresponding to the liquid level in said container, the improvement in said apparatus which comprises:
one of said probe and group of elements of first polarity, passing through the internally cooled portion of said wall and having substituted for a portion of the length thereof, (a) in the case of said probe a material of substantially the same thermoelectric characteristics as said elements of first polarity, and (b) in the case of said elements of first polarity a conductor substantially equivalent to the material of said probe,
said substituted portion extending from the region of said wall which is internally cooled to said location adjacent the exterior face of the mold,
whereby the reference voltage supplied to said resistor is the same as the voltage of the elements of first polarity which happen to be located above the liquid level in the container.

* * * * *